United States Patent
Schwartz et al.

(10) Patent No.: US 6,836,796 B2
(45) Date of Patent: Dec. 28, 2004

(54) SYSTEM AND METHOD TO MANAGE NETWORK-ENABLED EMBEDDED DEVICES OPERATING UNDER VARIOUS PROTOCOLS

(75) Inventors: Elliot Schwartz, Sunnyvale, CA (US); David A. Holzer, San Jose, CA (US); John Maloney, Sunnyvale, CA (US); Kit Fitzpatrick, Fremont, CA (US)

(73) Assignee: Digi International, Inc., Minnetonka, MN (US)

( * ) Notice: Subject to any disclaimer, the term of this patent is extended or adjusted under 35 U.S.C. 154(b) by 774 days.

(21) Appl. No.: 09/811,140

(22) Filed: Mar. 16, 2001

(65) Prior Publication Data

US 2002/0133581 A1 Sep. 19, 2002

(51) Int. Cl.[7] .............................................. G06F 13/00
(52) U.S. Cl. ...................................... 709/223; 709/217
(58) Field of Search ................................ 709/200, 201, 709/203, 217, 218, 219, 223, 224, 227

(56) References Cited

U.S. PATENT DOCUMENTS

| | | | |
|---|---|---|---|
| 5,956,487 A | 9/1999 | Venkatraman et al. ...... | 709/248 |
| 6,011,842 A | 1/2000 | Brivet et al. ................. | 568/722 |
| 6,052,750 A | 4/2000 | Lea ............................. | 710/72 |
| 6,233,611 B1 | 5/2001 | Ludtke et al. ............... | 709/223 |
| 6,282,568 B1 | 8/2001 | Sondur et al. ............... | 709/223 |
| 6,288,716 B1 | 9/2001 | Humpleman et al. ....... | 345/329 |
| 6,311,220 B1 | 10/2001 | Fischer et al. .............. | 709/230 |
| 6,370,141 B1 * | 4/2002 | Giordano et al. ........... | 370/386 |
| 6,405,310 B1 * | 6/2002 | Simpson ........................ | 713/1 |
| 6,405,366 B1 * | 6/2002 | Lorenz et al. .............. | 717/107 |
| 6,430,570 B1 * | 8/2002 | Judge et al. ............. | 707/103 R |
| 6,496,860 B2 * | 12/2002 | Ludtke et al. .............. | 709/223 |
| 6,529,936 B1 * | 3/2003 | Mayo et al. ................ | 709/202 |
| 6,601,086 B1 * | 7/2003 | Howard et al. ............. | 709/203 |

\* cited by examiner

*Primary Examiner*—Moustafa M. Meky
(74) *Attorney, Agent, or Firm*—Alan Heimlich, Esq.

(57) ABSTRACT

A device management system (DMS) enables a plurality of network-enabled embedded devices potentially having a variety of device protocols to communicate via a network with a remote device system server. The DMS includes a back-end management applications server, and a module to translate different interface protocol formats associated with various of the devices into formats suitable for the applications server. The applications server is enabled to use multiple protocols and representations, and can use protocols and interfaces that are simpler than what the devices actually use, thus hiding potential complexity. Especially advantageous is the ability of the DMS to manipulate the representations and behavior of the devices, including the ability to augment functionality and to merge devices to create virtual devices.

20 Claims, 2 Drawing Sheets

SYSTEM AND METHOD TO MANAGE NETWORK-ENABLED EMBEDDED DEVICES OPERATING UNDER VARIOUS PROTOCOLS

FIELD OF THE INVENTION

The present invention relates generally to communicating with appliances that include embedded devices, and more particularly to communicating with a device management system (DMS) having a DMS server for device-based applications, which server communicates via a network with such appliances using an architecture that can accommodate various network-enabled embedded device protocols.

BACKGROUND OF THE INVENTION

So-called object-oriented device representation or device-object modeling has been applied to various consumer and industrial devices ranging from copy machines to washing machines, vending machines, utility meters, and so on. In embedded object technology, each device may be deemed an object in a software sense, which model can enable embedded devices to have more functionality, complexity, and power.

It is known in the art for users to remotely utilize, configure, and monitor embedded devices over a communications network, and many devices are network-enabled devices. Embedded devices that can be appropriately network-enabled will require a more scalable, robust management system. Unfortunately embedded devices produced by different manufacturers often have different device protocols to generate and transmit data and control information to or from the devices. Some exemplary device protocols that are under present development include universal plug-and-play (UPnP), Jini, Salutation, LON, and Emware.

The variety of existing device protocols complicates the implementation of a management terminal system intended to communicate via a network with many such devices, regardless of protocol. From the perspective of a management terminal system or application server, it often is desirable to use multiple protocols and representations, including for example conventionally-defined object-oriented interfaces, and SNMP. Preferably some such protocols and interfaces useable by the management terminal system or application server would be substantially simpler than what the devices under control use. If such control architecture were implemented, the protocol translation could advantageously hid much of the network-level complexity.

In addition to providing an ability to communicate, manage, and interact with various independent protocols, it could be especially advantageous to manipulate the appearance of the appliance-level device, for example to remove or to restrict access to certain device-level capabilities, to augment device-level functionality. Preferably such a management terminal system or application server should also be able to effectively merge multiple devices to create virtual devices with desired levels of control and functionality.

In summary, there is a need for a scalable, robust device management system that can support, manage, and control network-enabled embedded devices that use any of a variety of protocols. Such system should allow embedded device applications written in one format (e.g., SNMP) to manage embedded devices that support a different format (e.g., UPnP). Further, there is a need for a mechanism whereby existing network management systems can support and manage such network-enabled embedded devices using a range of communications media including LANs, WANs, or the internet. Such device management system should be able to modify the appearance including functionality of the controlled-device and should be able to merge multiple devices to create virtual devices with desired characteristics.

The present invention provides such a device management system and methodology.

SUMMARY OF THE PRESENT INVENTION

The present invention is a device management system (DMS) that provides an architecture and system enabling a remote device management server (DMS server) to communicate via a network such as the Internet with a plurality of network-enabled embedded devices having a variety of device protocols. The remote DMS server translates different information formats (UPnP, LON, etc.) associated with various of the devices into formats suitable for management applications. One result is that applications written for one format (e.g. SNMP) can be used to manage devices supporting a different device format (e.g. UPnP). The DMS server preferably communicates with a set of back-end management applications, which further communicate with a set of interface protocols, e.g., SNMP, Jini. The DMS server thus provides an interface between the devices (and device gateways) and the back-end management applications operating on the devices.

Overall, the DMS preferably is implemented with an object-oriented, layered architecture. One layer in this architecture is a device model (DM) core that supports an object model for modeling devices in any format and services, which core provides access control, logging, and historical statistics for represented devices. A device plug-in layer converts device protocols to the DMS object model and can support separate device plug-ins for each device protocol (e.g., LON, UPnP, Jini, Salutation, Emware). Application plug-ins implement interfaces between applications and DMS object models and services. Application plug-ins support standard protocols such as SNMP and Jini and run in the DMS address space.

The DMS advantageously can provide users with a very meaningful view of network-enabled embedded devices, and also gives system integrators a rich infrastructure to support a wide variety of networked devices. Overall, the present invention enables the embedded devices to run a commonly available network management application as a front-end application, while the DMS server provides an aggregation and semantic conversion service for the back-end management applications.

In the past, a system integrator having an SNMP management console to monitor devices configured and installed by the integrator could not readily offer new devices that could not also be managed with SNMP. However by using a DMS according to the present invention in which a common interface and network connectivity is provided for managed devices, even new devices can be communicated with in their native protocol, and management of such new devices can still occur with an existing SNMP console. In essence the devices can function as the user interface to the DMS.

Other features and advantages of the invention will appear from the following description in which the preferred embodiments have been set forth in detail, in conjunction with the accompanying drawings.

DETAILED DESCRIPTION OF THE PREFERRED EMBODIMENT

Figure 1:
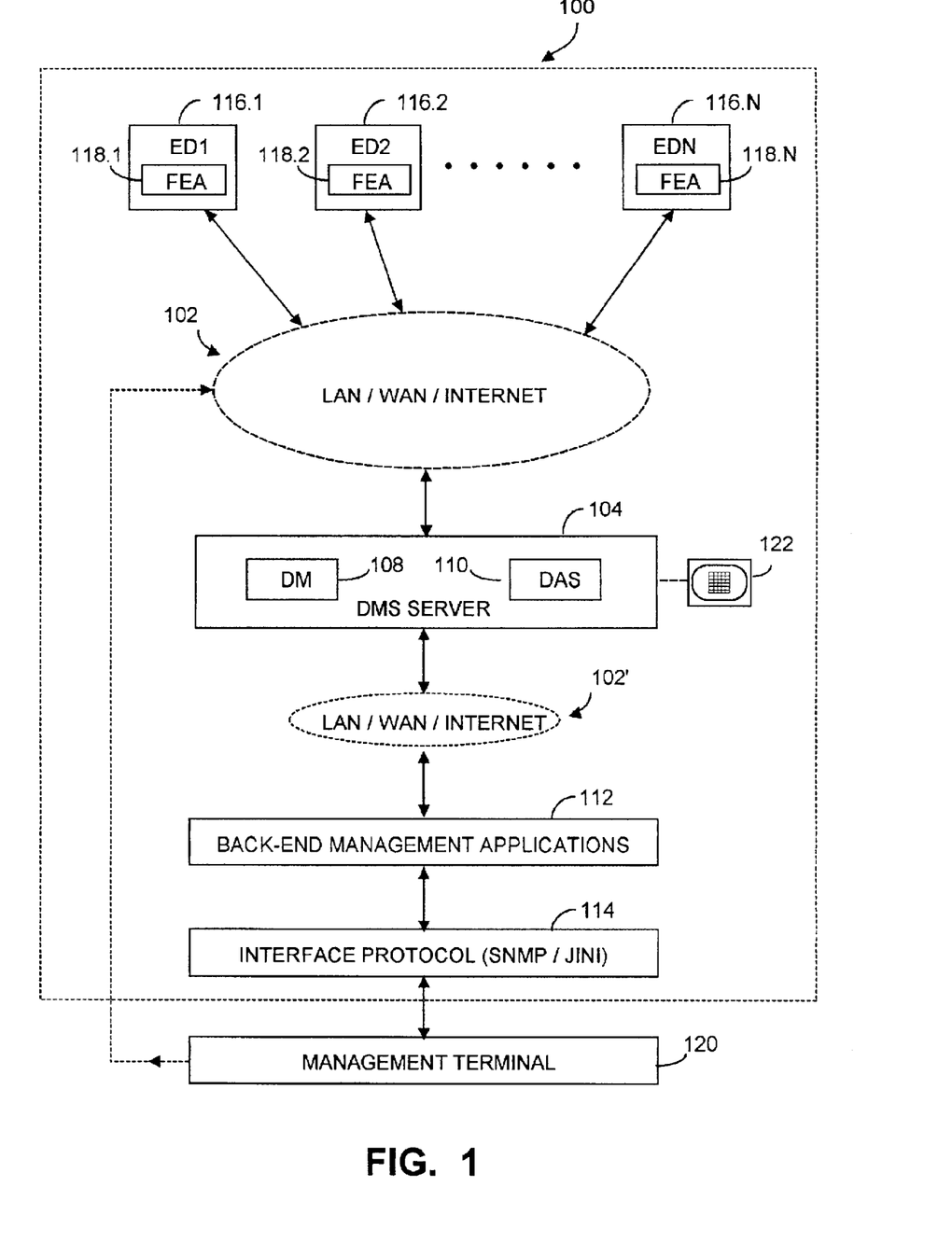
FIG. 1 is a block diagram of a device management system for managing embedded devices and network enabled embedded devices, including devices having different protocols, according to the present invention.

FIG. 1 shows a device management system (DMS) 100, according to the present invention, for managing network-enabled embedded devices, including such devices having a variety of protocols for communicating data and control information.

As shown in FIG. 1, DMS 100 will communicate via a communication medium such as a network 102 that can include without limitation a local area network (LAN) and/or a wide area network (WAN) and/or the Internet). DMS 100 further includes a device model system server 104, and a plurality of network-enabled embedded devices denoted 116.1, 116.2, 116.n. By way of example and without limitation, device 116.1 might be embedded within a copy machine, device 116.2 might be embedded within a dishwasher, and so forth. Each network-enabled embedded device 116.x will have an associated front end application (FEA) 118.x. FEA 118.x may properly be referred to as a device network interface, or device network protocol, or embedded application protocol.

An advantage provided by the present invention is that FEA 118.x may have an embedded application protocol that is unlike that of other of the devices 116.x. For example, FEA 118.1 associated with device 116.1 may use a UPnP protocol, whereas device 116.2 may use LON protocol, and so on. Some of the front end applications associated with some of the devices may in fact use a protocol unique to that particular device. Thus, a manufacturer of say network-enabled embedded device 116.x may use a proprietary protocol in writing the associated FEA 118.x. It will be appreciated that one advantage realized by the present invention is the ability of the DMS 100 to remotely control, manage, and/or interact with devices that use multiple protocols.

It is to be understood that, as used herein, a protocol is the interface that a controlled device exposes to the overall network system. As such, the protocol is independent of the software language that may have been used to implement the protocol.

Device management service server 104 communicates via network medium 102 with the various devices 116.x to obtain and process information from and for the various devices. As noted, in practice a great many different front end applications 118.x may be encountered among the various devices 116.x that are to be monitored and managed with the present invention.

DMS server 104 is an engine for transforming representations of devices. Server 104 preferably includes a device manager (DM) module 108, and a device actors module (DAS) 110. DAS 110 acts upon the representations from DM module 108 by creating, transforming, and exporting such representations. The division of tasks between DM module 108 and DAS module 110 permits DM module 108 to focus on how best to represent devices of any kind, and permits DM module 110 to focus on mapping devices of particular types and on manipulating devices in DM module 108, for example to add value and richness to their representation.

Overall, DMS server 104 functions as an intermediary to a back-end management applications module 112. Module 112 may also properly be referred to as a back-end management application server. Communications between DMS server 104 and back-end management application module 112 is typically via a network 102' that may, but need not be, the same sort of medium 102, described earlier herein, for example, a LAN, a WAN, an Internet connection, among other possible connections. Module 112 in turn communicates with a simple network interface protocol (SNMP) management module 114.

Interface protocol module 114 handles management of the embedded devices, for example through network 102 and/or 102', in accordance with a network management protocol, such as SNMP or Jini. Conceptually, one portion of module 114 may be regarded as being within DMS server 104, and the other module 114 portion may be regarded as being within the back-end management applications server 112, but located between DMS server 104 and the application portion of server 112.

External to the DMS 100 invention per se is a network terminal system 120 that helps manage the embedded devices, e.g., through network 102, in accordance with a network management protocol, such as SNMP or Jini, available from interface protocol unit 114. It is to be understood in viewing FIG. 1 that while network media 102, 102' are used by the present invention, these media are not per se part of the invention.

Conceptually, DMS server 104 may be described as a layered architecture in which each layer is dependent on the layer below it, and independent of the layer above it. From highest to lowest, the layers of the DMS are domain-specific (highest), infrastructure for access control, messaging, persistence (intermediate), and object model (lowest). DMS server 104 preferably is implemented to be Java™ compliant using standard development tools. Plug-in development follows accepted object oriented programming techniques to promote low coupling and high cohesion. Overall, DMS server 104 provides a rich set of APIs and tools to enhance plug-in developer productivity.

DMS server 104 preferably is deployed as a set of JAR files, text files, images, and other assorted file types found in any application, and server 104 can be configured by a standard installer for installation upon a target computer. Thus, DMS server 104 preferably does not require customized or specific installation requirements beyond those of a standard Java™ application, which advantageously frees integrators and value added resellers to write their own installation routines. If desired, multiple DMS server modules 104 may be provided to enhance redundancy and scalability.

Having described practical implementation design considerations in the preceding paragraphs, underlying conceptual design issues will now be described. Traditionally, in object oriented programming (OOP) systems, methods are merely individual functions that can be called to act upon an instance. In traditional OOP systems, a device instance may expose a variable that can be inspected or written to using a "getValue" or a "setValue".

But according to the present invention, DMS server 100 includes a DM module 108 that adopts a higher level view towards methods. In the present invention, device methods are not merely single functions, but rather are ways of interacting with the device instance. Thus, DM 108 considers exposed variables as a method of interfacing with the device instance. In traditional OOP systems, a method might be provided to add a listener, and a class defined for the event. But in the present invention, DM 108 enables a device instance to provide an event notification that is also considered a method of interfacing with the device instance. Using such a higher level notion for device methods, DM 108 can better capture semantics of the interface exposed by a device. Consequently, within DMS server 104, DAS 110 can more fully use the semantics of device interfaces when transforming the representation, or exporting the representation to an actual protocol.

The present invention permits the manufacturers of the network-enabled embedded devices 116.x to implement whatever front end applications 118.x they wish. The problem of enabling DMS server 104 to communicate with and control such a variety of devices and device protocols is met by including a back-end management applications module 112 that enables a common aggregation and semantic conversion service. Thus, regardless of the specific front-end application 118.x selected by a manufacturer of equipment including embedded device 116.x, DMS server 104 can communicate with that device using standard protocols, e.g., SNMP or JINI. If desired, a value-added consulting company may even wish to develop a custom domain-specific software solution for communicating with DMS server 104, according to the present invention.

DMS server 104 functions as the interface between the various embedded devices 116.x and the back-end management applications module 112. As such, DMS server 104 acts as an aggregation point for the embedded devices 116.x in translating information formats (e.g., UPnP, LON, etc.) from the embedded devices into a format suitable for use by the back-end applications module 112.

Thus, advantageously, back-end management applications server 112 can be written in a single format, yet can manage various embedded devices having many different formats. Server module 112 is the application within DMS 100 that controls and/or offers services to the devices 116.x. More specifically, server module 112 carries out higher-level application-specific goals that a systems integrator wishes to achieve with the devices 116.x being controlled. DMS server 104 helps provide the communications conduit for data and information passing between server module 112 and the various devices 116.x to be controlled, managed, or interfaced.

As noted, DMS module 106 includes a device model module 108 (DM) and a device actors module 110 (DAS). Device module 108 models information representations from any embedded device 116.x, regardless of the protocol used by that device. In the a preferred embodiment of the present invention, a device model representation includes three levels: device class, device instance, and device method.

As used herein, a device class means a representation of a kind of embedded device, i.e., not any specific device, but rather a common interface to all devices of a particular kind. In the simplest case there would be one device class for each different kind of device to be represented by device module 108. In the more general (and complicated) case, multiple device classes could exist for the same kind of device, e.g., to give devices different appearances within DM 108. As used herein, an interface between a device class and a device instance is made up of device methods.

Origination of a device class preferably occurs as follows. A user may implement a JAR file with classes that satisfy certain interfaces. A standard import module (or plug in) may produce a device class in response to user input, e.g., a management information database (MIB). A service may produce a device class automatically, e.g. from a UPnP description or Java™ description.

As used herein, a device instance represents a specific device that can be interacted with. In a simple case, a device instance is an actual physical device connected to the network 102 somewhere. A more complicated case could include virtual devices, e.g., devices that do not physically exist but perhaps are formed from representations and combinations of some actual devices 116.x. A device instance is always one of a certain kind of device in a device class, and a device instance is accessed though device methods.

A device class can create its device instance, but to do so, the device class will need all information necessary to initialize the instance. For a device class that represents an actual device on network 102, this information may include the device IP address, port number, and any other information the device class needs to communicate with that device. For a device class that results from applying service to transform a class, the information may include particular instance(s) of the device class upon which the transformation is based.

A device class can be used to create device instances manually or automatically. In a manual creation case, user interface or back-end management application server 112 informs DMS server 104 of the existence of a new device and of information required to create the device instance. In an automatic creation case, something looking for appearance of new devices (e.g., via service discovery protocol or via some explicit registration scheme) calls the device.

As used herein, a device method represents a way of interfacing with a device, and will involve some information exchange between the device and the user of the method. Pure device methods are methods the device exposes which do not have any additional semantics, and can take in any number of arguments of any type, and return any type of return value. Some device methods may include querying, or adjusting a variable, executing a command, or being notified of an event. A set of device methods forms an interface of a corresponding device class, and the set of device methods is used to act upon a particular device instance.

By way of example, consider a representation of a network of utility meters in DM 108. Let there be two device classes: AcmeWaterMeter (representing a type of water meter) and ElectricMeterModel2301 (representing an electric meter that a utility company has deployed and networked. Each water meter or electric meter actually installed at a house served by the utility company is represented by a device instance of the appropriate device class.

The device instances could be identified in a number of ways. For example, representation could include street address and device class, IP address of the meter, or even billing account number for the service. Interaction with a meter will use meter device methods. For example, a simple meter would have a method to learn the total amount of water or electricity used, while more complicated electric meters could display present cost of electricity, and have a method to adjust cost. Advanced water meters might have a method to notify the utility if a leak is suspected, e.g., an excessive amount of metered water has been used recently.

As used herein, device variables represent variables exposed by the device. As with most variables, device variables can expose two operations: a "set" and a "get." The "set" operation allows the value of that variable to be set, while the "get" operation returns the value of the variable. Some variables may be read-only or write-only, in which case they will only expose a "set" or a "get" operation. In a simple case, a "set" has one argument that is the same as the type of the variable, and returns nothing. Similarly, a "get" has no arguments, and returns a value that is the same as the type of the variable.

Parameterized variables are also possible, in which case both the "set" and the "get" take on an additional argument of an arbitrary type. Where these arguments are the same, it is likely that the "set" and "get" correspond to the same internal designation. Alternatively, the present invention can accommodate parameterized variables by supporting arrays of simple variables instead.

As used herein, device events represent events that the device can send, and are a form of asynchronous notification from a device. A device event has an operation for adding any number of listeners, wherein a listener is simply an operation of another device method. An alternative approach would be to implement the listener as a device method, in which approach the device method would determine to which operation, etc., the event is to be delivered. The device event passes data of some arbitrary type to the listener, and the device method operation is such that the listener must accept this type as its only argument.

The notion of device actors (DAS) and device space (DS) will now be described. A device model core preferably is formed from abstract concepts of device class, device class, and device method. As such, device space(s) (DS) are actual device classes, device instances, and device methods about which a particular DMS server has knowledge. Stated differently, a particular embodiment of a device model is a device space, and all device spaces are formed from the concepts defined by the abstract device model.

Device actors (DAS) manipulate a device space in some way. Without limitation, such manipulation may include adding, removing, or inspecting a device class, adding, removing or inspecting a device instance, and manipulating a device instance. The present invention recognizes several types of device actors (or plug ins or modules) including import modules, export modules, and service modules.

Import modules are device actors that create device classes and device instances in the device space. A user can configure DMS server 104 to load particular import modules, and after loading the import modules are free to manipulate the device space as they see fit. If desired, constraints can be imposed on the manipulation capacity of the import modules since, in practice, manipulation abilities can be limited to those needed for importing.

According to the present invention, a user may be permitted to code an import module in several ways. For example, some import modules may have been coded in Java™ and compiled by the user. A set of interfaces may be defined that must be met by device classes, device methods, etc., and within such constraints, the user could code and then explicitly assemble each interface separately. Alternatively, the user could implement the device class as though it were a class in an OOP system, and could use reflection for converting the OOP system class to the device class and its components. In practice, such user coded import modules may tend to create only a single device class, for the kind of device that it has been coded to represent, although multiple device instances of such device class will tend to be created.

Other import modules can be widely distribute for particular protocols. An import module for a particular protocol can create device classes for every kind of device using that protocol, given a protocol-specific description of the device. For example, a SNMP import module can create a device class given a MIB; a UPnP import module can create a device class based on an XML description document. Device class creation may be manual (e.g., the user must supply the description) or may be automatic (the description is learned automatically via network 102). Similarly, device instance creation may be manual (where the user must supply the information manually) or discovery may be automatic. Manipulating the device methods of a device instance in turn manipulates the corresponding device.

Export modules inspect and manipulate device classes and device instances in the device space to create representations of those device classes and device instances on the network. Export modules may be distributed for particular protocols. An export module for a particular protocol can take any device class and produce a protocol-specific description of the device. For example, an SNMP export module can create a MIB, given a device class. There may be more than one reasonable protocol-specific that can be created given a device class, in which case there should be a default case, with user interaction allowed to select other cases. Such user interaction preferably is accomplished using a graphical user interface (GUI) that the export module provides, or some annotations-metadata the user can attach to the device classes.

Device instances can be exported into any discovery system used by the protocol. Manipulating the device representation in that protocol in turn manipulates the device methods of the corresponding device instance. In practice, export modules are less likely to be coded by a user, as an export module that only acts like a single kind of device is not especially useful.

Service modules add functionality to the DMS and preferably are packaged as plug ins. In some ways service modules are similar to a device class, and can expose an interface that looks like a device class and create device instances. But instead of communicating with an actual device, the service is a layer on top of a device instance. Since a service can be applied to many different device classes, the device instances a service module creates can be of different types, which is an important difference between device classes and services. The service module can be constructed such that the device instances it controls are no longer visible in the device space. This can be useful in situations such as access control, where it is important that there be only one path to the device instance. It is also possible for a service to leave the underlying device instance exposed, in which case a service may add generic functionality, e.g., logging. The device instance is still available so other services can discover the instance and add other functionality to it.

The scope of a service is at the device class level, and it is applied to a device class and becomes active for all instances of that device class. A service will also have the same base behaviors as a device class in the management console. It can expose additional functionality to the console, but it will have full functionality as a device class. Thus, it can be manipulated in the same was as a device class, including behavior that allow its device instances to be targets of services. This is a basis for selectively layering functionality on specific device classes.

Preferably several DMS services are provided, and a service can be configured in many ways to interact with appropriate elements within the device space. An abstract and relatively inflexible configuration method is for the service developer to hard code behavior. This method may be appropriate where the vendor of an appliance that includes embedded devices wishes to add a specific capability to a specific device class, without allowing that capability to be added to any other device class. In such case, the developer would also know the device class of any device instances needed to be created, and such classes could also be hard coded.

For more generalized services, e.g., logging, the service preferably is initialized with a list of properties specifying what device classes it will act on, whether it will hide or leave exposed the original device class and device instances, and what the output device class will be. The service is then responsible for iterating the list of device classes where it will be applied. Then, for each device class in the list, the service will locate the device class within the DMS, will apply its behaviors to the actuators within the device class, hide device instances as needed, and create new device instances for all of the currently existing device instances. This initialization process is not necessarily a function of starting the service, but can occur at any time, to allow reconfiguring the service without a shutdown/startup cycle. Preferably the current service configuration is always kept by the service, and can be read from the service to facilitate display or export of configuration information. Exporting the configuration allows configurations to be persisted or migrated to another DMS or used for other such purposes. Methods by which UPnP protocol may map into a device object model (DOM) according to the present invention will now be described. In terms of representation, UPnP devices or UPnP services may be DOM device classes. If multiple inheritance were in the DOM, both aspects could be used since UPnP services are device classes, and a UPnP device is just a device class that inherits methods from all its UPnP service device classes. If interfaces were used they could be UPnP device types, but more generally UPnP device types could be deemed device classes as well.

In terms of discovery, in at least a LAN environment the DMS could listen for simple service discovery protocol (SSDP) announcements. Alternatively, the DMS could issue queries for all UPnP devices (or some subset of UPnP devices to which the UPnP collection is configured to listen), and then automatically create device instances as required. Advantageously a UPnP device furnishes its own description. As a result, after a DOM notices a UPnP device of an unknown type, the DOM could automatically generate a DeviceClass for its type, as well as a device instance for the device itself. Alternatively, an SNMP device could transmit its management information base.

Preferably SST entries would be device variables, and commands would be pure device methods, and events would be device events. For communication, the UPnP import module would implement UPnP protocols, and have a "rehydrator" function, e.g., a piece of code able to translate a UPnP device description into an API for accessing the device.

DOM to UPnP mapping will now be described. Device classes may automatically generate UPnP descriptions, and device variables may be mapped into the SST, and device variables as well as pure device methods mapped into the commands. In practice, some pure device methods need not be mapped into commands as some methods are not relevant to device variables. In some applications it may be useful to also map arguments and return values from pure device methods into pseudo SST entries for functionality. Device events would be mapped into events. By default a device instance of a particular device class is preferably mapped into a device with a single service containing all of the methods. The UPnP export module may, for example, permit dividing up the methods into different services, and could also allow different device instances to be set as child devices of other device instances.

In some applications it can be useful to record representation-specific data about device classes and instances for the DOM. Such feature would be useful, for example, in remembering the imported UPnP structure (how UPnP Services and UPnP Devices are organized, which are children of others), even if not directly reflected in the DOM. Thus, if these device classes and Instances were exported, preferably but not necessarily using the same representation, the export module could use such information to recreate the extra UPnP information as it was, without any extra configuration. Device instances preferably are announced to the network using SSDP. Preferably the DMS also responds to SSDP queries and provides a "web server" offering documents, e.g., XML, for the description and interaction of events and actions.

UPnP services and UPnP device types are concepts unique to UPnP, yet it is desired to capture such services and device types for use with the present invention. Such capture should permit exporting in another form using a different protocol, and should permit exporting to UPnP in the same form as imported, for example where functionality is to be added but not translation.

One approach is to use a metadata facility to store the extra information, for example storing each UPnP device, UPnP service, and UPnP device type as a separate device class. Annotating the UPnP device device classes will indicate which UPnP service device classes and UPnP device type device classes they implement. Alternatively, since UPnP services and UPnP device types have good object-oriented analogs, one might expand the DOM to include these analogous concepts.

For example, a synergism appears present with inheritance-polymorphism-interfaces. UPnP devices comprise a group of UPnP services, but do not have variables and commands. Thus a UPnP device device class would not implement device actuators, whereas a UPnP service device class would so implement. Instead, a UPnP device device class would simply inherit device actuators from the UPnP service device classes from which it is made. Alternatively, a UPnP device device class might implement all the device actuators, and a UPnP service could be represented as a device interface. A UPnP device device class would be said to implement all the UPnP service device interfaces it comprises. The above approaches involve changes to the DOM. Preferably the present invention can accommodate use of a UPnP device having nested UPnP devices, although in practice such encounters might be relatively uncommon.

The present invention preferably includes a standard set of services that have proven useful in a wide variety of applications. Such services may include caching, archiving, filtering, polling, event filtering, summarization, DMS configuration, DMS monitor, OS services (host interface), access control, authentification-identification, among others.

Various standard services will now be described with their interaction with a device class within the device space. Provide a caching service adds caching functionality to a DOM entity. A regular device class may have a set of device variables that are uncached, e.g., any read or write of that device variable results in an access across the network to the actual device. However, this can be undesirable as it consumes network bandwidth and increases response time. If the data changes infrequently and/or consistency can be relaxed, caching can help deal with these issues. For example, once the DMS has accessed the device to read a value, caching the read involves retaining a copy memory. Subsequent read operations will use this in-memory copy without having to re-access the device. A timeout mechanism will enable the DMS to go to the actual device to obtain a fresh copy of the value.

Write caching is similar but involves more serious consistency issues as state changes occur. Accordingly, more complicated caching policies are used, preferably by importing the device class to which caching will be applied, and then selecting device variables for which caching is to be added. The caching service constructs a new implementation of the device class identical to the old device class, except that for the method(s) to be cached, the implementation allocates local storage for the return value and a timeout field.

Further, the implementation will return the local storage if it exists and if the timeout has not yet expired. Otherwise, the same method of the old device class is invoked to fetch the return value from the actual device, and to update the local storage and timeout field as well as return it. Interestingly, the new device class is very similar to the old device class. Since none of the device actuators has changed, the new device class has the same interface signature as the old device class, but may have different interface semantics. Where notions of consistency and/or freshness are expressed or implied, preferably a different interface documentation is prepared. But as the old and new device classes are similar, the option exists to use the old class rather than create a new device class.

The above description pertains to device class and device variables that the caching service imports and exports when it is applied. However the caching service can also import and export specific instances of that device class. To do this, the caching service is told the device instances of the device class to which it should be applied. The caching service will import references to these instances, while exporting new device instances that represent versions of those devices with caching. The specification of those instances to import may be done as grouping mechanism, for example as part of a secondary or tertiary ring of system architecture. The grouping mechanism would allow the user to easily express notions, and would allow the DMS to easily persist the notions. Such notions would include this particular instance, this arbitrary group of instances, this group of instances all having something in common, i.e., all the instances that belong to a particular device class, all the instances that were imported from a particular import module.

The DMS uses a standard archiving service to provide archival ability for a device. By way of example, assume that a soda vending machine uses a getNumberOfSodas method, which returns the current number of cans of sodas in the machine. With an archiving service, the device can also support a parameterized getNumberOfSodas method, where the parameter is a time. The DMS can then respond with the number of cans of soda that were in the machine at various time in the past. At a device class level, the archiving service imports any device class that has some device variables, and can be used to archive at least some of those device variables. The archiving service exports a new device class that is the same as the old device class except for each of the applied device variables will have an additional device variable that is parameterized by a time, and can report the archived value for its associated device variable. In this example a new device class is needed, or at the very least the new device class will be a subtype of the old device class, if the DOM supports the notion of sub-typing. As before, the device instances to which the archiving service should be applied will be specified.

Optionally, the archiving service can work with device events and with device variables. Rather then occasionally querying the old device instance to get the value to archive, device values would be archived when they reached the device events.

If desired, the archiving service could be implemented on top of a polling service used to periodically collect the value to archive from the old device instance. A standard polling service can periodically poll a device variable of the old device class, and reports poll results via a (regularly scheduled) device event added to the new device class. Polling can be configured by scheduler and timer services that work together to invoke a specified device method at the scheduled time. The results of the invocation can then be packaged into a device event for delivery to registered event listeners.

A filtering service may be included among the standard services to re-export an object with removed device actuators. An event filtering service conditionalizes a device event based on another state of the device instance. Event filtering may be used, for example, for thresholding, e.g., sending an event when a value changes. Thresholding involves a polling service periodically polling the device variable to be thresholded, such that a device event is sent out at a regular interval by the polling service, which device event is conditionalized by the event filtering service. Conditionalization is such that a device event from the new device class only occurs if the polled value differs from the previous polled value.

A standard summarization service can be used to create a new, entirely different, device class that represents some summarization of data in the DOM. For example, the new device class might only export one device variable that is getNumberOfEmptySodaMachines. To compute this, the summarization service would import all of the Soda machine instances, read their getNumberOfSodaCans device variable, and if zero, increment the count of empty soda machines to be returned by one.

A standard DMS configuration service exposes actuators to view and change the configuration of the DMS. The DMS services does not create device instances and is not applied to any device class. The actuators include a shutdown actuator that shuts down the DMS, an unloadPlugin actuator that shuts down and unloads a plugin and is used for any plugin type (e.g., services, import modules and export modules), a getDeviceClassList actuator that returns the list of device classes currently in the device space, a getDeviceInstances actuator that returns the list of device instances for a given device class, a getAllDeviceInstances actuator that returns the list of all device instances, and a getPlugInList actuator that returns the list of plugins that are currently installed.

A DMS monitor standard service exposes actuators to get the internal state of the DMS. This services creates no device instances and is not applied to any device class. A getThreadList actuator returns the list of currently executing threads, a getObjectCount actuator returns the number of objects in the device space, and a getDMSUtilization actuator returns the percentage of processing used by active components in the system to provide a measure of how much work is being done by the DMS.

An OS services (host) interface service exposes actuators that return information from the host operating system on which the DMS is running. Exposed actuators include historian/logger, scheduler, event something?, Old stuff, and infrastructure. The DMS builds several useful facilities on top of the object model, such as access control, messaging, and persistence, and these facilities form the infrastructure layer. The infrastructure layer is dependent on the object model, but defines no domain-dependent concepts.

A standard access control service is also provided. The DMS provides access control at the granularity of [class, instance, method], access being granted on the basis of membership in an access control list (ACL). The DMS also includes a messaging facility, preferably implemented as a store-and-forward messaging queue that can support asynchronous communication between instances within a single object space.

As also shown in FIG. 1, system 100 preferably includes a monitor 122 functionally coupled to DMS server 104 for purposes of displaying a graphical user interface (GUI) for a user of the system. As noted herein, devices 116.x are preferably modeled as objects. Thus, a simple view of a device type can be presented in which a device type is a class with methods, and a particular device is an instance of the class with methods that can actually be called. These characteristics may be graphically displayed on monitor 122 (or the equivalent), for example as tables to allow users of system 100 to select devices and to execute methods. Further, device actors (service) operate by modifying device classes and methods, which permits a user of system 100 to simply mouse-click (or the equivalent) on an appropriate method upon which the user wishes to apply services.

Figure 2:
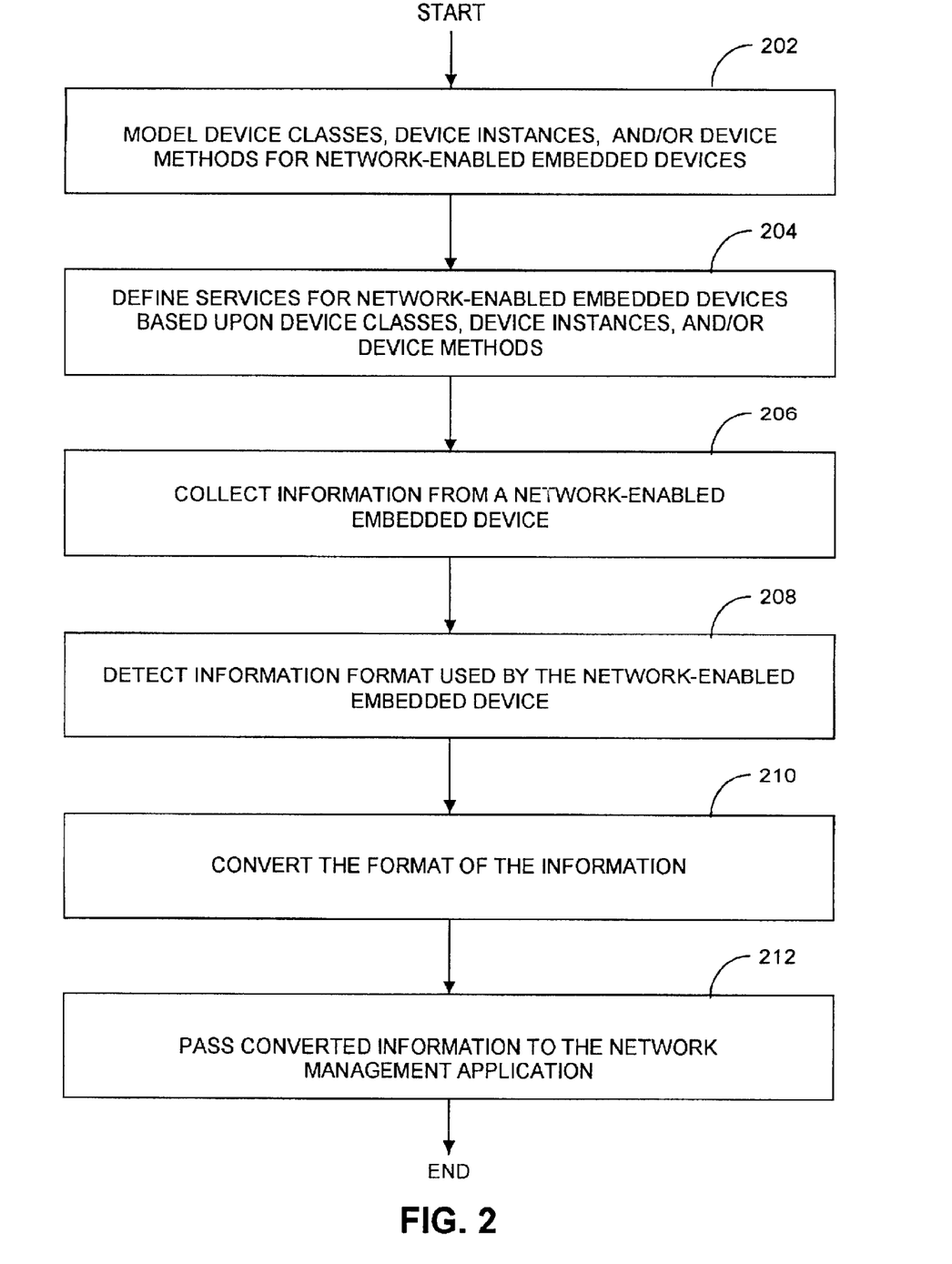
FIG. 2 is a flow chart depicting operation of the present invention.

FIG. 2 is flowchart depicting an exemplary process of managing embedded devices using the network management system shown in FIG. 1, according to the present invention. Step 202 depicts the modeling, or collection of models, of device classes, device instances, and/or device methods, for a plurality of network-enabled embedded devices such as devices 116.1, 116.2, . . . 116.n in FIG. 1. Step 202 may be performed manually or automatically.

At step 204, services are defined for the plurality of embedded devices, according to the classes, device instances, and device methods associated with each device.

At step 206, DMS server 104 collects information from one of the embedded devices (116.1, 116.2, . . . , or 116.n), for example via communications network 102. Step 206 will be repeated for each embedded device. At step 208, DMS server 104 detects the information format for each of the embedded devices by determining the protocol governing operation of that device.

At step 210, DMS server 104 converts information collected from the embedded devices into the format in suitable for the back-end management applications server 112. As noted, preferably back-end management applications server 112 supports the SNMP or Jini protocol, based on the device class, device instance, and device methods modeled for the embedded device. At step 212, DMS server 104 passes the converted information to back-end management applications server 112, for further processing of the collected information.

It will be appreciated that when using a Jini protocol or a Java RMI protocol, the device that will be available over the network is already object oriented, and thus rather well adapted to be modeled as an object. When using a Jini protocol or a Java RMI protocol, the present invention bases its model upon what is already present, and can use, by way of example, Java Reflection to extract the class and method aspects for the model, or Jini Discovery to discover instances. For RMI protocol, a user will manually inform system 100 as to instances.

Consider the follow exemplary conversion involving a soft drink dispensing machine or appliance that includes a network-enabled embedded device that can communicate with the present invention. Assume that Java is employed as follows:
Device Class: SodaMachine
Device Method: int getPrice( ) // returns the price in cents
Device Method: void setPrice(int p) // sets the price in cents
Device Method: int getCansRemaining(int type) // gets the number of cans remaining of a particular type. 1=coke, 2=juice, 3=water, . . .
Device Method: void addEmptyListener(EventListener el) // subscribes to notices when the machine is out of cans.
Let translation be into the following SNMP MIB:
—Fill in the XXXparentXXX in the following line:
   IMPORTS XXXparentXXX
—Fill in the XXXparentXXX and XXXchildNumberXXX in the following line:
   sodaMachine   OBJECT-IDENTIFIER::=
   {XXXparentXXX XXXchildNumberXXX}
   price OBJECT-TYPE
   SYNTAX INTEGER
   ACCESS read-write
   STATUS mandatory
   DESCRIPTION "GET returns the price in cents. SET sets the price in cents"
   ::={sodaMachine 1}
One alternative:
cansRemainingTable OBJECT-TYPE
SYNTAX SEQUENCE OF CansRemainingEntry
ACCESS not-accessible
STATUS mandatory
DESCRIPTION "A list of cansRemaining for each type."
::={sodaMachine 2}
cansRemainingEntry OBJECT-TYPE
SYNTAX CansRemainingEntry
ACCESS not-accessible
STATUS mandatory
DESCRIPTION" "
INDEX {cansRemainingType}
::={cansRemainingTable 1}
CansRemainingEntry::=
SEQUENCE {
cansRemainingType INTEGER,
cansRemaining INTEGER
}
cansRemainingType OBJECT-TYPE
SYNTAX INTEGER {
coke(1),
juice(2),
water(3)
}
ACCESS read-only
STATUS mandatory
DESCRIPTION "A unique value for each type. 1=soda, 2=juice, 3=water, . . . "
::={cansRemainingEntry 1}
cansRemaining OBJECT-TYPE
SYNTAX INTEGER
ACCESS read-only
STATUS mandatory
DESCRIPTION "GET gets the number of cans remaining of a particular type."
::={cansRemainingEntry 2}
Another alternative:
cansRemaining OBJECT-TYPE
SYNTAX SEQUENCE OF INTEGER

```
ACCESS read
STATUS mandatory
DESCRIPTION "An array to get the number of cans
    remaining of a particular type.
1=soda, 2=juice, 3=water, . . . "
INDEX {INTEGER}
::={sodaMachine 2}
```
The following may also be provided:
```
empty TRAP-TYPE
ENTERPRISE sodaMachine
DESCRIPTION "The machine is out of cans.":=0
```
The following behavior may also be implemented: Listen for SNMP get requests. If request arrives, translate request to the appropriate object get request. Subscribe to the events. If event arrives, send a trap. Note that thread issues exist in that SNMP devices typically have one device per IP address, whereas a DMS server 104 typically represents many devices. This issue may be handled using different parts of the MIB, which could also be run on different port numbers such that one IP address can represent multiple SNMP devices.

In practice, DMS 100 is likely to be deployed in an environment in which a firewall exists between DMS server 104 and the network-enabled embedded devices 116.x to be managed, and between the DMS server and its clients. However by including standard techniques for firewall traversal, such as device-initiated connections and HTTP, the presence of firewalls will not impair operation of the present invention.

It will be appreciated that the present invention can communicate with many hosts, which feature is advantageously promoted by having DMS 100 scalable to multiple physical machines. By "scaling" it is meant that the present system can grow in some dimension(s), yet still function reasonably well by fulfilling necessary requirements. Growth dimensionality may include without limitation: the number of devices (Device Instances), the rate at which devices communicate with the DMS, the amount of data the devices exchange with the DMS, the number of device types (Device Classes), the complexity of a device type (number of Device Methods), the number of export modules, the number of management applications, the rate at which management applications communicate with the DMS, the number of services, the number of devices a service accesses, the computational requirements of services, and the memory requirements of services.

Scaling may be accomplished by vertical partitioning, and/or by horizontal partitioning. In vertical partitioning, different device instances are supported by different machines such that if it is desired to add more devices, one simply provides additional machines. Since operation of each device is relatively independent, relatively little communication is required to occur between machines. Communication will occur if the user of the present invention wishes to present a summary view (or other similar device actor/service) of devices that are on different machines. In horizontal partitioning, different actors operating on the same device (in series) are supported by different machines. Thus, if it is desired to add more device actors, one adds additional machines, and makes the model of the device (as modified by the actor) available on the next machine with the next actor. Preferably this is implemented using an import and export module that replicates the device model as-is from one server to another. Thus, the GUI shown on monitor 122 (see FIG. 1) can display representations of devices and permit a user of system 100 to manually initiate the same activities as could be done through the relevant protocol.

In the above description of scaling, a single administrative domain can control multiple machines and multiple devices. However the present invention can also accommodate an environment in which multiple machines and multiple devices are controlled by different administrative domains.

For example, network enabled devices under DMS management may well be useful to multiple parties. Thus, a networked refrigerator device might provide several pieces of information, including shopping lists, calorie counts, and operational status. Consider a first party, namely the owner of the refrigerator. The first party may well be interested in his/her caloric intake, but would not necessarily care to share that information with a second party, perhaps the grocery store, or a third party, perhaps the refrigerator repair company. On the other hand, the second party (the grocery store) may possess its own information concerning inventory on hand and current pricing. While the grocery store may wish to share the current pricing information with the refrigerator owner, the grocery store would not necessary also wish to share its inventory information, perhaps because of lack of trust in the first party. In this simple example, there is a need for two parties (the refrigerator owner and the grocery store) to exchange some information, but not all information.

How then to provide a single machine that is usable and configurable by different administrative domains that, for reasons of trust or otherwise, do not wish to exchange full information. This goal can be especially challenging to implement because ultimately the machine will reside at some location, and may be co-opted by the party with access to that location. In the present invention, it is therefore preferred that each party run its own DMS server, whereon it is the only fully trusted party, and exchange only desired information with another party's DMS server. This goal may be accomplished by a first party using filtering services to create a representation of a device that the first party is willing to allow a second party to access. The first party then exports only this limited version of the device to the DMS server of the second party, and perhaps other parties.

Modifications and variations may be made to the disclosed embodiments without departing from the subject and spirit of the invention as defined by the following claims.

What is claimed is:

1. A method of using a back-end network management application that supports a predetermined protocol to manage, over a network, network-enabled embedded devices that support different protocols, the method comprising the following steps:

(a) detecting format information for one of said network-enabled embedded devices coupled to said network;

(b) collecting information from said network-enabled embedded device over said network;

(c) converting information collected at step (b) into a format complying with said predetermined protocol; and (d) passing said converted information to an application running under an environment in compliance with said predetermined protocol.

2. A method of using a back-end network management application that supports a predetermined protocol to manage, over a network, embedded devices that support different protocols, the method comprising the following steps:

(a) modeling each of said embedded devices into device class, device instance, and/or device method;

(b) collecting information from each of said embedded devices; and (c) converting information collected at step (b) into a format complying with a predetermined protocol supported by said back-end network management application according to device class, device instance, and device method modeled for each of said embedded devices.

3. The method of claim 2, further comprising:
(d) passing information converted at step (c) to an application running under an environment in compliance with said predetermined protocol.

4. The method of claim 3, wherein:
step (a) further includes defining services according to device class, device instance, and device method modeled for each of said embedded devices.

5. For use with a device management server associated with a plurality of management applications, a method of managing networked devices over a network using the management applications, the method comprising the following steps:
(a) detecting format information for one of said devices coupled to said network;
(b) collecting information from said device over said network;
(c) selecting one of said management applications to manage said device;
(d) converting information collected at step (b) into a format complying with a protocol supported by the management application selected at step (c); and
(e) communicating with said device over set network using said selected management application and a predetermined protocol to manage said device.

6. For use with a device management server associated with a plurality of management applications, a method of managing networked devices over a network using the management applications, the method comprising the following steps:
(a) detecting format information for one of said devices coupled to said network;
(b) collecting information from said device over said network;
(c) selecting one of said management applications to manage said device;
(d) converting information collected at step (b) into a format complying with a protocol supported by the management application selected at step (c); and
(e) managing the network device using the selected management application that support a predetermined protocol.

7. The method of claim 6, further comprising a step of communicating over said network with said devices controlled by the management applications supporting different protocols.

8. The method of claim 6, further comprising a step of communicating over said network with said devices controllable using by different protocols.

9. The method of claim 6, further comprising a step of using said device management server to modify appearance of said device to said management applications.

10. The method of claim 6, further comprising caching collected information for said device.

11. The method of claim 6, further comprising a step of providing access control to said device.

12. The method of claim 6, further comprising a step of polling event information for said device.

13. The method of claim 6, further comprising:
providing virtual devices;
providing a user-accessible graphical user interface to select a construction configuration of a view of said virtual devices; and
presenting at least one view of said virtual devices selected from a group consisting of (i) a summary view, and (ii) an aggregate view.

14. The method of claim 6, wherein:
said device management server is scalable to multiple physical machines such that communication can occur with network devices hosted in different hosts; and
said scaling includes at least one of (i) vertical partitioning in which different device instances are supported by different machines, and (ii) horizontal partitioning in which different actors operate on a common device in series and are supported by different machines; and
wherein said scaling accommodates at least one number of devices (Device Instances), rate at which devices communicate with said device management server, amount of data devices exchange with said device management server, number of device types (Device Classes), complexity of a device type (number of Device Methods), number of export modules, number of management applications, rate at which management applications communicate with said device management server, number of services, number of devices a service accesses, computational requirements of services, and memory requirements of services.

15. The method of claim 6, further comprising providing a console to facilitate monitoring said devices and said management server.

16. The method of claim 6, wherein a plurality of said management servers is deployed to manage said devices.

17. The method of claim 16, wherein various of said plurality of management servers are controllable by different users.

18. The method of claim 6, wherein at least one said protocol is selected from a group consisting of (i) SNMP, (ii) Upnp, (iii) Jini in which a networked device is already object oriented, and (iv) Java RMI in which a networked device is already object oriented.

19. The method of claim 6, further including providing archiving for said device.

20. The method of claim 6, further including a step of providing event filtering for said device.

* * * * *